United States Patent

Askins

[11] Patent Number: 5,862,624
[45] Date of Patent: Jan. 26, 1999

[54] CAGE TRAPS

[75] Inventor: William E. Askins, Lititz, Pa.

[73] Assignee: Woodstream Corporation, Lititz, Pa.

[21] Appl. No.: 600,160

[22] Filed: Feb. 12, 1996

[51] Int. Cl.$^6$ ................................................. A01M 23/18
[52] U.S. Cl. ..................................... 43/61; 43/58; 43/60
[58] Field of Search ................................. 43/58, 60, 61, 43/62, 70; 119/474

[56] References Cited

U.S. PATENT DOCUMENTS

| | | |
|---|---|---|
| 1,054,564 | 2/1913 | Kline . |
| 1,327,229 | 1/1920 | Erickson . |
| 1,410,738 | 3/1922 | Dorseth . |
| 1,453,795 | 5/1923 | Hovell . |
| 2,167,291 | 7/1939 | Bowman . |
| 2,692,453 | 10/1954 | Wingfield . |
| 2,725,661 | 12/1955 | Bowman . |
| 2,965,259 | 8/1960 | Johnson . |
| 3,834,063 | 9/1974 | Souza et al. ................................ 43/70 |
| 3,896,766 | 7/1975 | Martin .................................... 119/474 |
| 3,913,258 | 10/1975 | Souza et al. ................................ 43/60 |
| 3,975,857 | 8/1976 | Branson et al. ............................ 43/61 |
| 4,162,588 | 7/1979 | Wyant ........................................ 43/61 |
| 4,484,540 | 11/1984 | Yamamoto . |
| 4,527,512 | 7/1985 | Sugiura . |
| 4,546,568 | 10/1985 | Seyler ........................................ 43/62 |
| 4,557,067 | 12/1985 | Ha . |
| 4,567,688 | 2/1986 | McKee ....................................... 43/61 |
| 4,604,823 | 8/1986 | Ponzo . |
| 4,696,257 | 9/1987 | Neary et al. . |
| 4,762,085 | 8/1988 | Ondrasik .................................. 119/17 |
| 4,829,700 | 5/1989 | Ha ............................................ 43/61 |
| 5,010,848 | 4/1991 | Rankin . |
| 5,329,723 | 7/1994 | Liul ........................................... 43/61 |
| 5,549,073 | 8/1996 | Askins et al. ............................ 119/474 |

FOREIGN PATENT DOCUMENTS 593752  2/1934  Germany .

OTHER PUBLICATIONS

Tomahawk Live Trap Company Brochure; pp. 1–8 (1994).
Havahart Brochure from Woodstream; pp. 1–8 (1994).

*Primary Examiner*—Michael J. Carone
*Assistant Examiner*—Darren Ark
*Attorney, Agent, or Firm*—Jacobson, Price, Holman & Stern, PLLC

[57] ABSTRACT

A cage-like animal trap has a door mechanism at a front end of the trap which closes on an animal inside of the trap when the animal steps on an internal trip pan while going for bait positioned at the rear of the trap. The door mechanism has a main body panel pivoted to the roof of the trap and a reactor plate pivotally connected to the bottom edge of the body panel and urged away from the body panel by a spring. In the open position, the body panel and reactor plate are squeezed together and lie flat against the roof of the trap held in place by a hook-like trigger in the roof. When the trigger is released by an animal stepping on the trip pan, the body panel of the door is lowered by gravity and the reactor plate springs away from the body panel with its top edge sliding outwardly along the inside of the roof until it engages a stop at the front of the roof. A drop latch in the roof prevents the top edge of the reactor plate from sliding back to the open position of the door mechanism unless the catch is lifted from outside of the trap so that the trapped animal cannot open the door from inside the trap. The trap is disclosed in collapsible and non-collapsible versions.

9 Claims, 7 Drawing Sheets

FIG. 6 are folded into the footprint of the base.

CAGE TRAPS

BACKGROUND OF THE INVENTION

This invention relates to cage-type animal traps of the kind generally used outdoors for trapping smallish animals without harming the trapped animal. Such traps commonly comprise a cage of metal mesh or the like with a door held open by a trigger mechanism until an animal lured into the trap by suitable pre-inserted bait actuates a trip which releases and closes the door, thereby trapping the animal inside the cage.

Cage-type traps of the above kind are usually rigid structures and take up considerable space, particularly when a number of such traps need to be transported by vehicle to an on-site location. Accordingly, a need may be said to exist for cage-type traps which can be collapsed for storage and transportation but which can be readily erected, in situ, into a sufficiently rigid cage-like structure. The present invention is directed, inter alia, towards fulfilling such need.

SUMMARY OF THE INVENTION

The invention provides a collapsible animal trap structure having a top wall or roof, side walls and a base, preferably made of metal mesh. The side walls are hinged top and bottom to the top wall and base respectively, and the side walls have top and bottom panels connected along a central hinge joint so that the side walls and top wall can fold down onto the footprint of the base by inward concertina-like folding of the side walls along the hinge joint. The top and bottom panels of the side walls may have an overlap at the central hinge joint preventing the side walls from folding outwardly beyond the vertical.

The structure has a folding rear wall of metal mesh which folds down inwardly onto the base before the side walls fold inwardly. When the cage is erected, the rear wall is held in position by a rod which passes through folded flanges on opposite sides of the cage. One end of the rod is bent at right angles and is releasably secured in a clip on one side of the cage.

The front end of the trap is provided with a two-part door having a sheet metal main body panel hinged internally to the roof of the trap. The body panel is spring-loaded downwardly toward a closed position by a flat spring acting against a yoke-like reactor plate hinged to the bottom of the main panel and which, when the door is open, is trapped against the top wall of the cage. The spring has a loop to form a grip facilitating opening of the door. The door is held in an open position against the top wall of the cage by a hook-like trigger hinged to the cage structure.

A trip pan inside of the cage is connected to the trigger, for releasing the door and closing same on a trapped animal, by a cable extending along one of the side walls. The cable, in contrast to solid rod-type trigger connections, facilitates folding of the trap.

The trap is held rigid in an erected condition by one or more U-shaped rods which fit under the base or over the roof of the cage and the arms of which fit releasably into clips or the like provided on the side walls.

Mesh with variable size mesh openings, or solid metal sections, can be used for selected areas of the trap, for example, to prevent animal access from the outside to bait within the trap. The door may have plastic edges to prevent sticking and binding, and the trigger cable and bait tray may be coated to reduce friction and prevent corrosion. Individual spaced hinges may be used to connect the folding parts of the structure or alternatively single, continuous hinges such as piano hinges may be used to provide more precise hinge movements.

In accordance with another aspect of the invention, the door and trigger mechanism described above is used in a rigid, non-folding cage-type trap. Since the trap does not have to fold, the cable can be replaced, in this case, by a rod connecting the trip pan and trigger.

Additional features and advantages of the invention will become apparent from the ensuing description and claims read in conjunction with the attached drawings.

DESCRIPTION OF PREFERRED EMBODIMENTS

Figure 2:
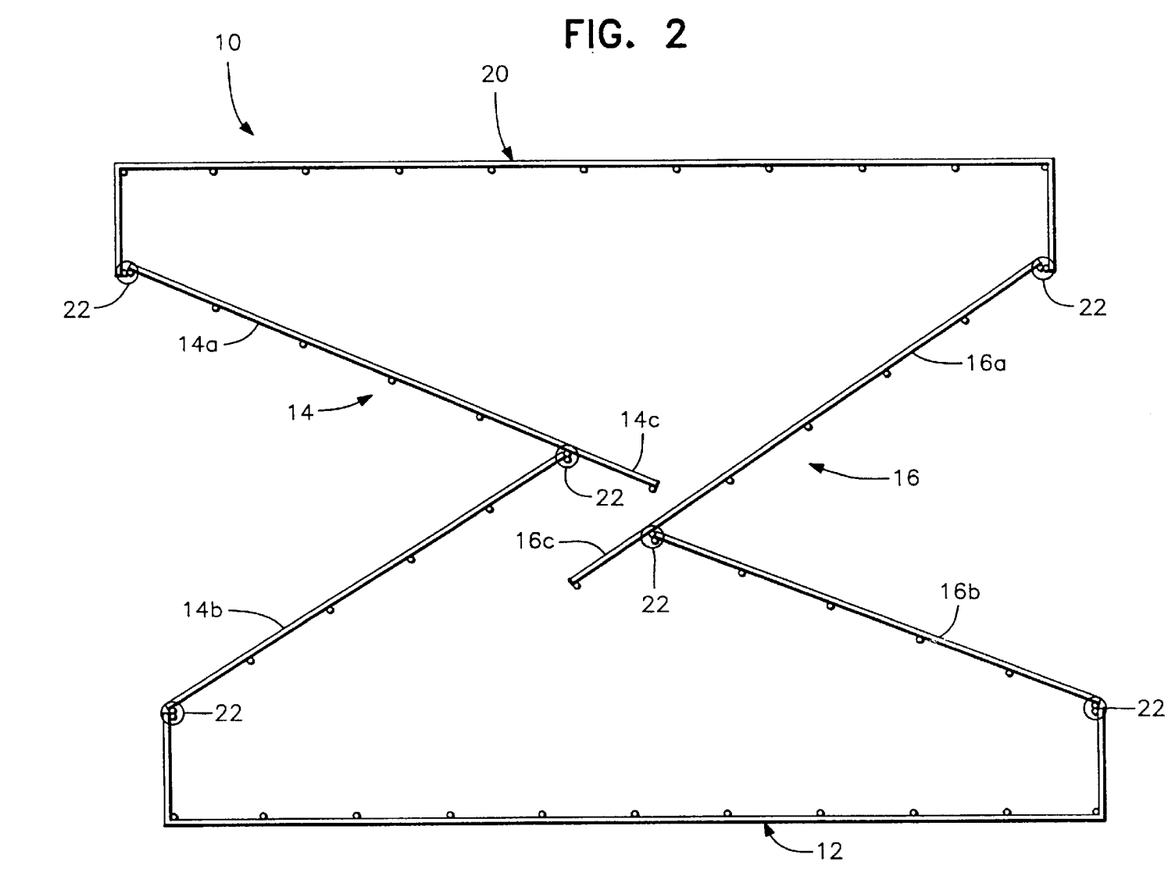
FIG. 2 is a diagrammatic end view of the trap during folding.
Figure 3:
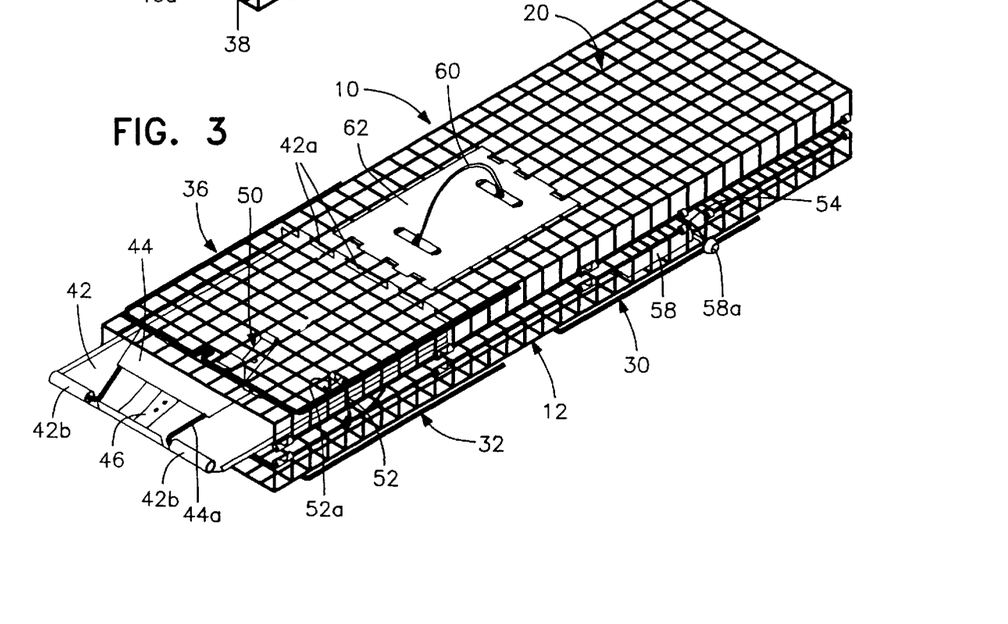
FIG. 3 is a perspective view of the trap fully folded for storage or transport.
Figure 4:
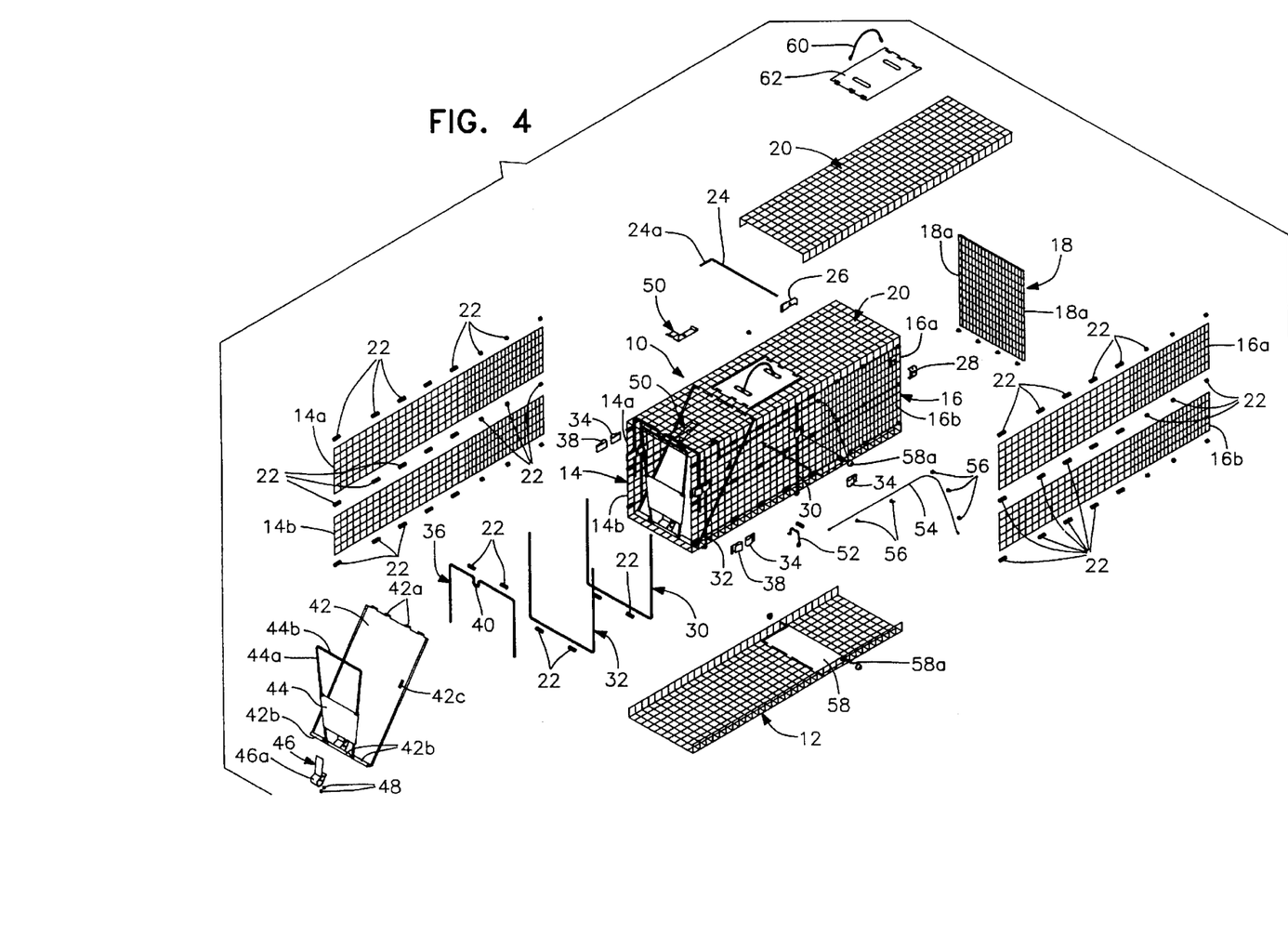
FIG. 4 is an exploded perspective view of the trap.
Figure 5:
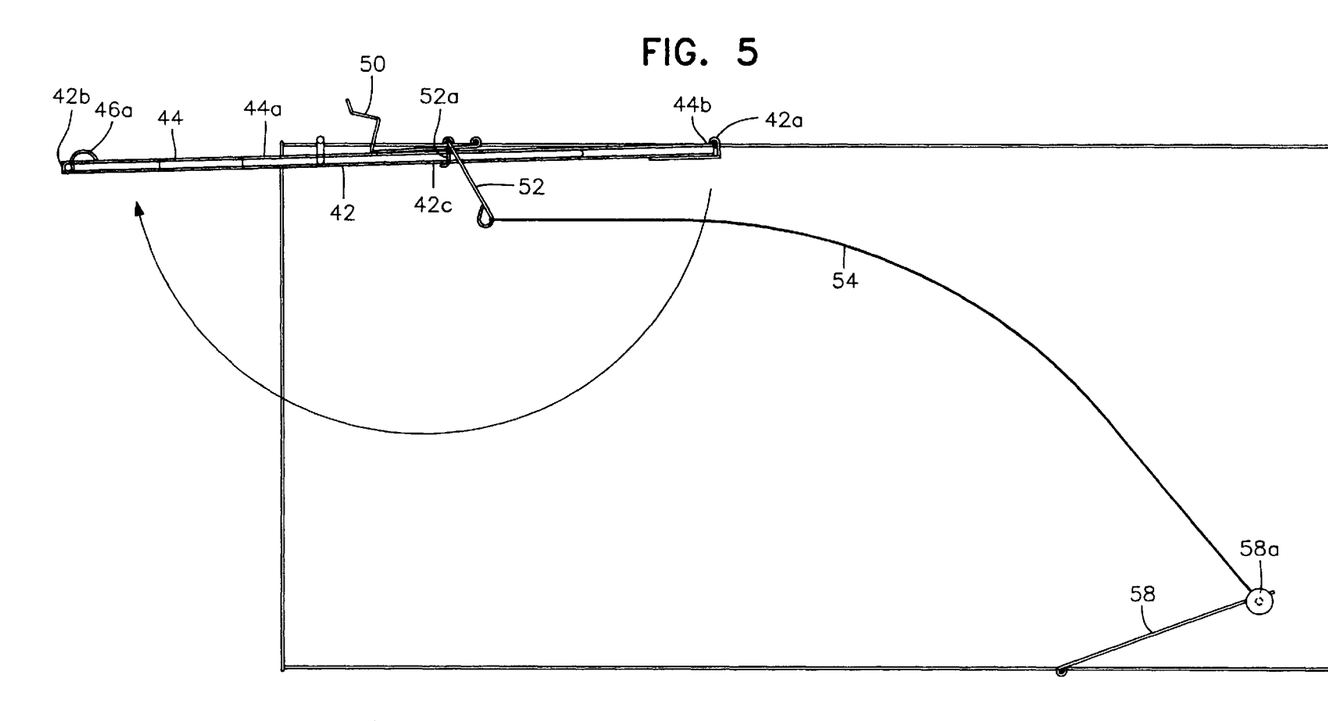
FIGS. 5, 6, and 7 are somewhat diagrammatic side elevational views illustrating the operation of the trap's door and trigger mechanism for releasing the door.
Figure 6:
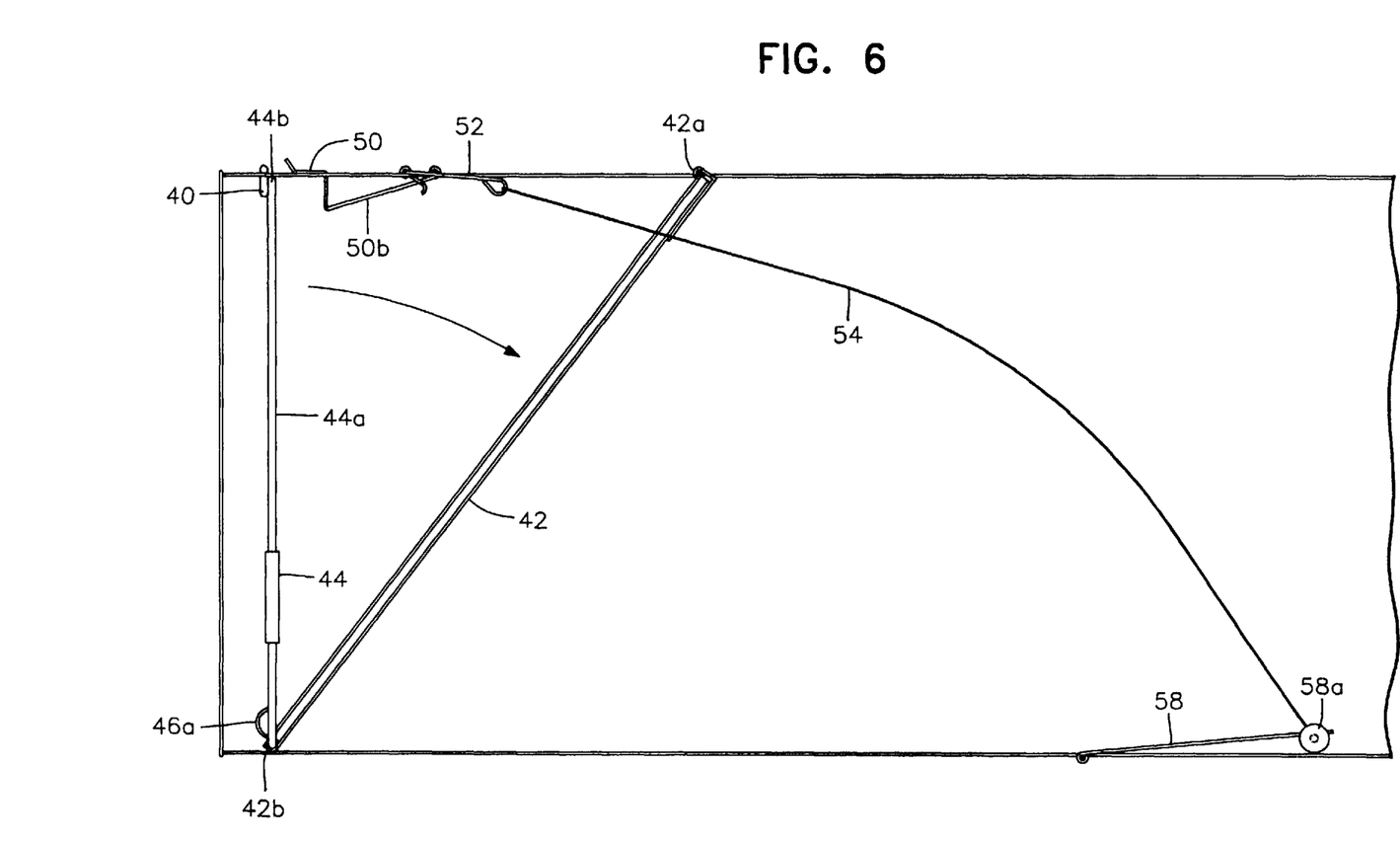
Figure 7:
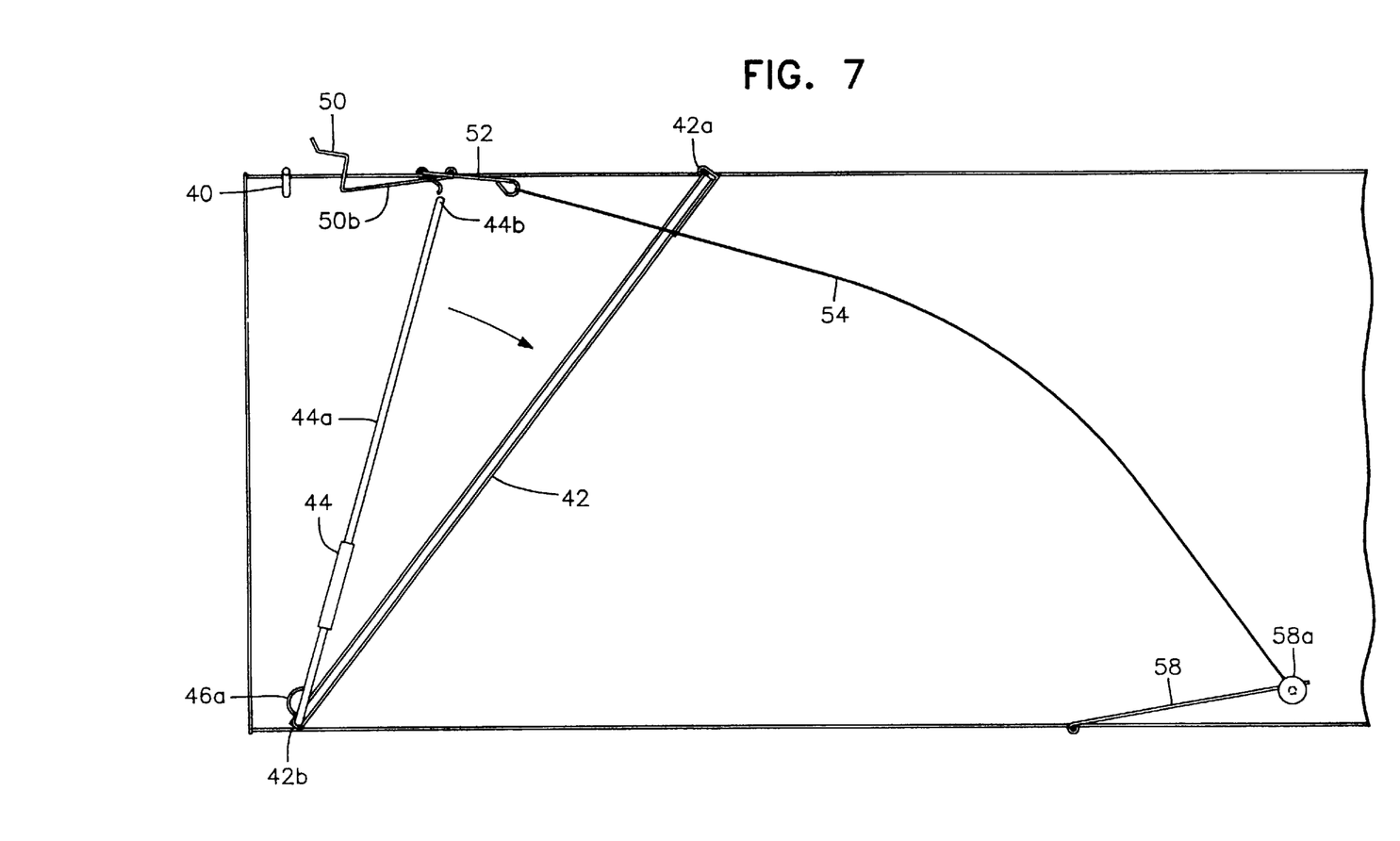

The collapsible cage-type trap 10 shown in FIGS. 1–7 comprises, as most clearly seen in FIG. 4, an elongate base 12 with upturned sides, side walls 14, 16, each comprising upper and lower panels 14a, 14b and 16a, 16b, a rear wall 18 and a top wall or roof 20 with downturned sides, all of the noted components being formed from sheets of metal mesh.

The respective panels of the side walls 14, 16 are mutually hinged together by tubular hinges 22 with one line of mesh forming an overlap 14c, 16c as best seen in FIG. 2. The tops of the side walls are hinged to the downturned sides of top wall 20 and the bottoms of the side walls are hinged to the upturned sides of base 12. All of the hinge connections are made by tubular hinges 22.

The bottom of rear wall 18 is hinged to the back edge of base 12 by further tubular hinges so as to be able to fold down onto the bottom of the dished base. Then, the side walls can be folded inwardly concertina-style as shown in FIG. 2 to collapse the cage structure into a flat package as shown in FIG. 3, wherein the side walls, rear wall and roof are folded into the footprint of the base.

Figure 1:
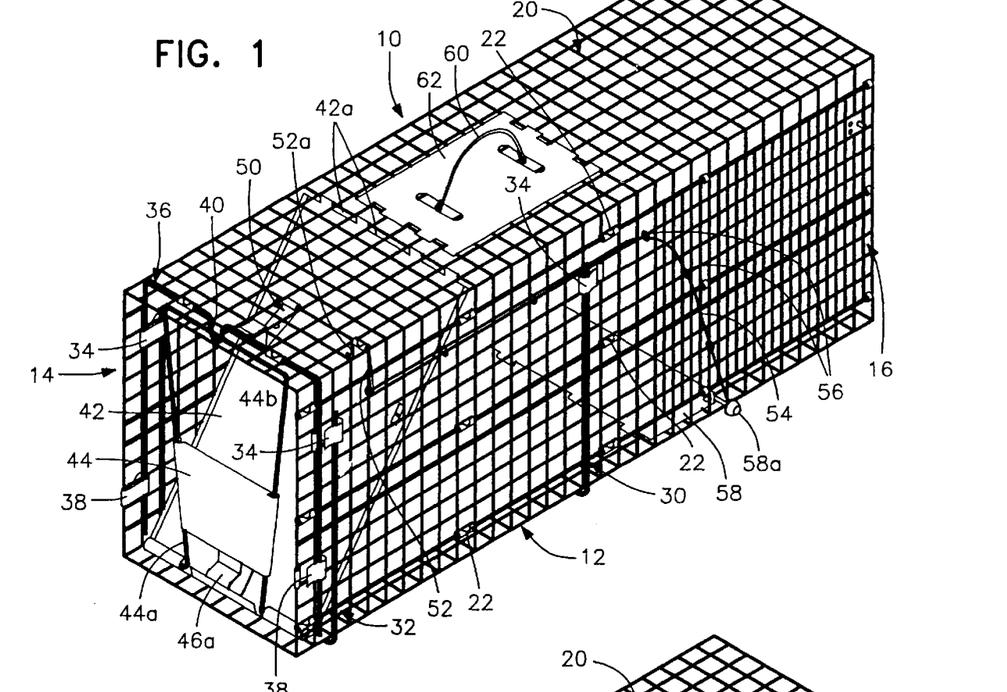
FIG. 1 is a perspective view of a folding cage-type animal trap according to the invention shown in an erected position.

When the structure is elevated from the folded condition, it can be rigidified in the erected position shown in FIG. 1 by means of several releasable locking rods. A first rod 24 passes transversely through apertured flanges 26, 28 secured to the side wall upper panels 14a, 16a at the back end of the cage structure and also through a mesh opening in bent side portions 18a of rear wall 18. Rod 24 has a right-angle bend 24a at one end to fit in a clip portion formed on flange 26. When fitted through the flanges and through the mesh opening in the rear wall, the rod holds the rear wall rigidly in the upright elevated position.

Second and third U-shaped rods 30, 32 are hinged to the base 12 by tubular hinges 22 so that the arms of the rods can swing down along the bottom of the base when the structure is folded as in FIG. 3, or can swing up on the outside of the side walls to be received in clips 34 on the side wall upper panels when the cage is erected to rigidify the side walls and prevent their inward folding.

A fourth U-shaped rod 36 is pivotally connected to the outside of the roof 20 to swing up along the roof (FIG. 3) when the trap is folded and down when the trap is unfolded so that the arms of rod 36 engage in additional clips 38 on the side walls. Rod 36 has a central kink 40 providing a stop for a door mechanism of the trap to be described below.

The trap has a two-part door comprising a main door panel 42 and a reactor element or plate 44. Door panel 42 has loops 42a along its top edge by which it is hinged to the roof of the trap at a location spaced inwardly from the front end of the cage. The bottom edge of panel 42 has further loops 42b which pivotally trap outwardly directed arms of a wire yoke 44a which forms part of the reactor element and carries a sheet metal plate to form the intermediate portion of the reactor element. A looped leaf or plate spring 46 has one limb attached by fasteners 48 to panel 42 and another limb acting against the reactor plate 44 in a manner urging the reactor plate and panel 42 apart. The spring has a loop 46a forming a finger hold enabling a user to lift the door mechanism up from the closed position illustrated in FIGS. 1, 4 and 6 into the open or set position shown in FIG. 5.

In the open or set position of the door mechanism, panel 42 and plate 44 are squeezed together against the action of spring 46 and lie flat against the roof of the cage with the top bar 44b of yoke 44a sliding back along the inside of the roof towards the top edge of panel 42. A pivotal stop or drop latch 50 in the roof of the cage must be lifted by the user to allow bar 44b to slide back along the roof. The stop 50 prevents an animal trapped in the cage from opening the door from inside the trap by pushing outwardly against panel 42. A retaining hook or trigger 52 pivotally mounted in the roof of the cage can be manipulated by the user to fit one limb 52a of the hook through an aperture 42c in panel 42 and hold the door in the open or set position.

An opposite limb of hook 52, situated on the outside of the cage, is connected by a cable 54 passing through guides 56 attached to side wall 16 to a projecting end 58a of a trip pan or treadle 58 pivotally mounted in the base of the cage along its bottom edge. Projecting end 58a is at the top free edge of the trip pan and the length of cable is such that when the trap is set, the free edge of the pan is elevated slightly from the base of the cage. The mesh opening in side wall 16 through which end 58b projects is made sufficiently high to allow for pivotal movement of the pan.

In use, bait may be placed in the trap behind pan 58 towards rear wall 18. When an animal enters the trap, going for the bait, and steps on the trip pan, hook 52 is pivoted to release the door, which springs into the closed position with top bar 44b sliding over ramp surface 50b of stop 50 thereby raising the stop and being arrested by the kink 40 in rod 36. The animal can then only be released by a user lifting stop 50 and opening the door.

The trap is provided with a carrying handle 60 on a plate 62 attached on the roof. It is evident that the mesh openings in the walls of the cage are smaller at the rear of the trap where the bait is to be located than at the front, to prevent an animal from extracting the bait from outside of the trap.

Figure 8:
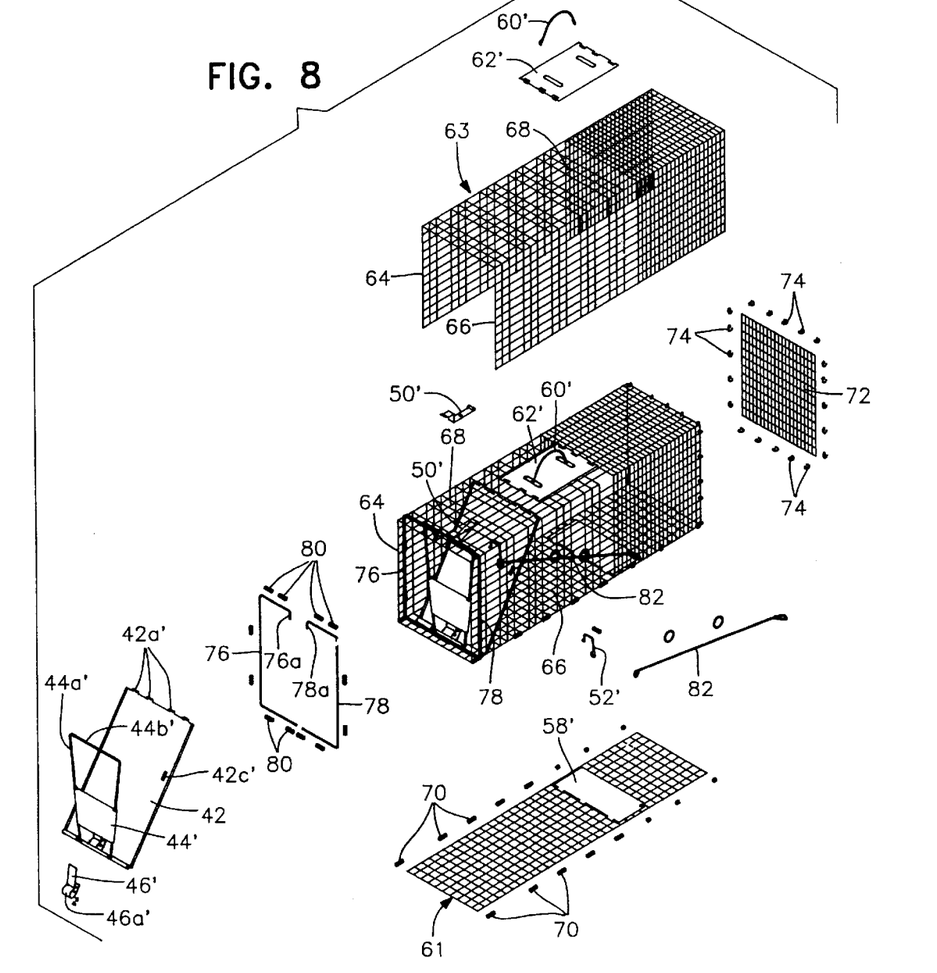
FIG. 8 is an exploded perspective view, similar to FIG. 4, of a non-folding trap according to the invention.

FIG. 8 shows the construction of a non-folding trap having a door mechanism according to the invention. The trap in this case comprises a mesh base 61, a cage-like element 63 of folded mesh having side walls 64, 66 and a roof 68, which is attached to the base by tubular connectors 70, and a rear wall 72 attached to the base, side walls and roof by connectors 74. At the front, the trap has a door mechanism similar to that described in relation to FIGS. 1 to 7, and like references (primed) are used to denote like parts. In this case, however, since the walls of the trap do not need to fold, the U-shaped pivotable rod 36 with kink 40 of the previous embodiment is replaced by a pair of rods 76, 78 attached by connectors 80 to the base, side walls and roof. The rods have inwardly turned ends 76a, 78a to provide a stop for the top bar 44b' of reactor plate yoke in like manner to the kink 40 as previously described. Also, the cable 54 of the previous embodiment is replaced by a rod 82.

It is evident that the trap shown in FIG. 8, apart from its lack of foldability, operates in like manner to that shown in FIGS. 1 to 7. It is also evident that in both embodiments the side walls of the cage have smaller mesh openings towards the back of the trap to prevent an animal from reaching the bait from outside of the trap.

While only preferred embodiments of the invention have been described herein in detail, the invention is not limited thereby, and modifications can be made within the scope of the attached claims.

I claim:

1. An animal trap comprising a base, side walls, a roof, a rear wall, a front end provided with an animal access opening, a door mechanism for the front end of the trap, a trip pan inside of the trap to be actuated by an animal going for bait strategically located within the trap and a linkage between the trip pan and the door mechanism for closing the door mechanism and trapping the animal within the trap responsive to actuation of the trip pan, the door mechanism comprising a substantially impermeable main body panel having a top edge pivotally attached internally to the roof of the trap at a location spaced inwardly from said front end, a reactor element including upper, intermediate and lower portions, the lower portions of the reactor element being pivotally attached to a lower edge of the main body panel and a spring element connected between the main body panel and the intermediate portions of the reactor element urging the main body panel and reactor element apart, the door mechanism having an open position with the reactor element and main body panel squeezed together against the force of the spring element and being located substantially flat against the roof internally of the trap with the reactor element situated between the main body panel and the roof, said linkage including a trigger member for engaging the door mechanism and holding the door mechanism in the open position, said trigger member being movable to release the door mechanism by actuation of the trip pan by an animal entering the trap allowing the main body panel to drop by gravity to a closed position of the door mechanism accompanied by separation of the main body panel and reactor element effected by said spring element with said upper portions of the reactor element moving forwardly along the roof of the trap and wherein the main body panel in the closed position extends downwardly to the base of the trap and the reactor element extends across the front end of the trap, the roof of the trap having a stop for arresting the upper portions of the reactor element in the closed position of the door mechanism, a finger-engaging member secured to the lower edge of the door mechanism, the door mechanism being movable manually from the closed position to the open position by lifting up on the finger-engaging member, the spring element being a leaf spring, portions of the leaf spring being secured to the lower edge of the main body panel and defining a loop which forms the finger-engaging member to facilitate lifting of the door mechanism.

2. The animal trap as claimed in claim 1 including a drop latch in the roof of the trap for engaging the upper portions of the reactor element and preventing the reactor element from being moved rearwardly to the open position of the door mechanism unless the drop latch is lifted manually from outside of the trap, thereby precluding a trapped animal from opening the door mechanism by exerting pressure internally on the main body panel, the drop latch having a ramp surface along which the upper portions of the reactor element are adapted to slide when moving from the open position to the closed position of the door mechanism, thereby raising the drop latch.

3. The animal trap as claimed in claim 1 wherein the main body panel of the door mechanism comprises a sheet metal element, wherein the reactor element comprises a wire yoke having side limbs, a cross-bar connecting said limbs and defining the upper portions of the reactor element, the wire yoke also including bent ends defining the lower portions of the reactor element and being attached to the lower edge of the main body panel, the intermediate portions of the reactor element further including another sheet metal element connected between the side limbs and wherein the spring element has opposed arms extending from the finger loop, one of said arms being attached to the main body panel, the other of said arms being attached to said another sheet metal element.

4. The animal trap as claimed in claim 1 wherein the rear wall has a pivot connection with the base for folding the rear wall down onto the base, wherein the side walls each have upper and lower panels with a hinge connection between the upper and lower panels, the lower panel of each side wall being pivotally connected to the base and the upper panel of each side wall being pivotally connected to the roof for folding the side walls inwardly about said hinge connections thereby to collapse the roof and door mechanism when in the open position downwardly onto the base, the trap further including releasable attachments for holding the side walls and rear wall in elevated positions when the trap is in use and wherein said linkage includes a flexible cable connected between the trip plate and the trigger to extend along one of the side walls when the side walls are elevated for use, the flexibility of the cable accommodating folding movement of the one side wall about the connection between the upper and lower panels of the one side wall.

5. The animal trap as claimed in claim 4 wherein said attachments include a U-shaped rod having a cross-bar pivotally connected across one of the roof and base of the trap, the rod having side arms located adjacent to the side walls of the trap, the rod being swingable between a first position to be used when the trap is collapsed wherein the side arms extend along said one of the roof and base and a second position to be used when the trap is elevated for use wherein the side arms extend vertically along the side walls of the trap and wherein one panel of each side wall includes a clip for receiving a respective one of said side arms in the second position of the U-shaped rod for holding the side walls in the elevated position.

6. An animal trap comprising a base, side walls, a roof, a rear wall, a front end provided with an animal access opening, a door mechanism for the front end of the trap, a trip pan inside of the trap to be actuated by an animal going for bait strategically located within the trap and a linkage between the trip pan and the door mechanism for closing the door mechanism and trapping the animal within the trap responsive to actuation of the trip pan, the door mechanism comprising a substantially impermeable main body panel having a top edge pivotally attached internally to the roof of the trap at a location spaced inwardly from said front end, a reactor element including upper, intermediate and lower portions, the lower portions of the reactor element being pivotally attached to a lower edge of the main body panel and a spring element connected between the main body panel and the intermediate portions of the reactor element urging the main body panel and reactor element apart, the door mechanism having an open position with the reactor element and main body panel squeezed together against the force of the spring element and being located substantially flat against the roof internally of the trap with the reactor element situated between the main body panel and the roof, said linkage including a trigger member for engaging the door mechanism and holding same in the open position, said trigger member being movable to release the door mechanism by actuation of the trip pan by an animal entering the trap allowing the main body panel to drop by gravity to a closed position of the door mechanism accompanied by separation of the main body panel and reactor element effected by said spring element with said upper portions of the reactor plate moving forwardly along the roof of the trap and wherein the main body panel in the closed position extends downwardly to the base of the trap and the reactor element extends across the front end of the trap, a stop for limiting movement of the upper portions of the element away from the main body panel in the closed position of the door mechanism, the door mechanism being movable manually from the closed position to the open position by lifting up on the lower edge of the main body panel, wherein the spring element comprises a leaf spring having opposed arms, one of the arms being connected to the main body panel, the other of the arms being connected to the intermediate portions of the reactor element, and the arms having a junction formed as a finger loop to facilitate lifting the door mechanism from the closed position to the open position.

7. The animal trap as claimed in claim 6 wherein the main body panel of the door mechanism comprises a sheet metal element and the reactor element comprises a wire yoke having opposed limbs, a cross-bar on the yoke defining the upper portions of the reactor element and bent lower ends of the opposed limbs of the yoke defining the lower portions of the reactor element and being attached to the lower edge of the main body panel, the reactor element further including another sheet metal element connected between said limbs and defining the intermediate portions of the reactor element, and wherein the other of said arms of the leaf spring is connected to said another sheet metal element.

8. An animal trap comprising a base, side walls, a roof, a rear wall, a front end provided with an animal access opening, a door mechanism including a main body panel for the front end of the trap, a trip pan inside of the trap to be actuated by an animal going for bait strategically located within the trap and a linkage between the trip pan and the door mechanism for closing the door mechanism and trapping the animal within the trap responsive to actuation of the trip pan, said linkage including a trigger member for engaging the door mechanism and holding same in the open position, said trigger member being movable to release the door mechanism by actuation of the trip pan by an animal entering the trap allowing the main body panel to drop by gravity to a closed position of the door mechanism, wherein the rear wall has a pivot connection with the base for folding the rear wall down onto the base, wherein the side walls each have upper and lower panels with a hinge connection between the upper and lower panels, the lower panel of each side wall being pivotally connected to the base and the upper panel of each side wall being pivotally connected to the roof for folding the side walls inwardly about said hinge connections thereby to collapse the roof and door mechanism when in the open position downwardly onto the base, the trap further including releasable attachments for holding the side walls and rear wall in elevated positions when the trap is in use, and wherein said attachments include at least one U-shaped rod having a cross-bar pivotally connected across one of the roof and base of the trap, the rod having side arms located adjacent to the side walls of the trap, the rod being swingable between a first position to be used when the trap is collapsed wherein the side arms extend along said one of the roof and base and a second position to be used when the trap is elevated for use wherein the side arms extend vertically along the side walls of the trap, and wherein one panel of each side wall includes a clip for receiving a respective one of said side arms in the second position of each U-shaped rod for holding the side walls in the elevated position, the door mechanism comprising a main body panel having a top edge pivotally attached internally to the roof of the trap at a location spaced inwardly from said front end, a reactor element including upper, intermediate and lower portions, the lower portions of the reactor element being pivotally attached to a lower edge of the main body panel, and a spring element connected between the main body panel and the intermediate portions of the reactor element urging the main body panel and reactor element apart, the door mechanism having an open position with the reactor element and main body panel squeezed together against the force of the spring element and being located substantially flat against the roof internally of the trap with the reactor element situated between the main body panel and the roof, wherein, when the main body panel drops to a closed position of the door mechanism, the main body panel and the reactor element are separated by said spring element with the upper portions of the reactor element moving forwardly along the roof of the trap, and wherein one of the U-shaped rods includes a cross-bar pivotally connected across the roof, portions of said cross-bar defining a downwardly depending stop arresting the upper portions of the reactor element in the closed position of the door mechanism.

9. The animal trap as claimed in claim 8, including at least two U-shaped rods spaced from each other along the length of the side walls, with clips on the side walls for receiving side arms of each U-shaped rod, to thereby rigidify the trap when the side walls are in the elevated position.

\* \* \* \* \*